Oct. 21, 1969  H. W. GRIFFITHS  3,474,431
MAGNETO-OPTICAL TRANSDUCER
Filed Feb. 17, 1966  3 Sheets-Sheet 1

INVENTOR.
HENRY W. GRIFFITHS

ATTORNEYS

Oct. 21, 1969  H. W. GRIFFITHS  3,474,431
MAGNETO-OPTICAL TRANSDUCER
Filed Feb. 17, 1966  3 Sheets-Sheet 3

INVENTOR:
HENRY W. GRIFFITHS

By Smyth, Roston & Pavitt
ATTORNEYS

United States Patent Office 3,474,431
Patented Oct. 21, 1969

3,474,431
MAGNETO-OPTICAL TRANSDUCER
Henry W. Griffiths, Torrance, Calif., assignor to The Magnavox Company, a corporation of Delaware
Continuation-in-part of application Ser. No. 145,212, Oct. 16, 1961. This application Feb. 17, 1966, Ser. No. 528,118
Int. Cl. G11b 5/00
U.S. Cl. 340—174.1                            25 Claims

ABSTRACT OF THE DISCLOSURE

This invention relates to a system for converting magnetic states on a magnetizable medium into a non-magnetic representation such as a light pattern corresponding to the magnetic states. The invention includes a substrate such as a prism having first and second planar side surfaces disposed in angular relationship, different from a parallel relationship, to each other. The substrate also has a third side surface disposed in angular relationship, different from a parallel relationship, to the first and second planar side surfaces. A thin magnetic film is disposed on the third side surface and is adapted to be disposed in contiguous relationship to the magnetizable medium to have the magnetic states induced in the film from the magnetizable medium. Light from a source is directed through the first planar side surface to the third side surface where it is reflected by the thin magnetic film and rotated by the film in accordance with the magnetic states induced in the film. The light then passes through the second planar side surface to means for sensing only the rotated component of the light. The first planar side surface may be disposed in substantially perpendicular relationship to the light entering the substrate, and the second planar side surface may be disposed in substantially perpendicular relationship to the light leaving the substrate.

---

This is a continuation-in-part of application Ser. No. 145,212, filed Oct. 16, 1961, now abandoned.

This invention pertains to a magnetic-to-optical transduced and method, and relates more particularly to novel improvements in magnetic-to-optical transducers of the type represented in the copending U.S. patent application of Alfred M. Nelson, Ser. No. 124,676, filed July 6, 1961, and assigned to the same assignee as this application. In general, this invention involves the use of a transparent prismatic substrate to achieve improved light-spot resolution, and an improved signal-to-noise ratio in the output signal.

A magnetic-to-optical transducer and method of the type for which this invention is especially adapted generally comprises the establishment of a magnetic relationship between a first magnetized material and a thin magnetizable film so that the existing magnetic states of the former will be induced in the latter, and simultaneously transducing the induced magnetic states of the thin film into corresponding rotations of the major direction of polarization of a light beam reflected from the remote surface of the magnetized film. The first magnetized material may be, for example, a moving magnetic tape.

Heretofore, a transparent, arcuate substrate has been used for mounting the thin magnetic film in magnetic relation with the first magnetized material. It has been found that the spot formed by a polychromatic light beam on the surface of the thin magnetic film is defocused and enlarged on account of the differing degrees of refraction to which the various frequencies of the beam are subjected upon entering and emerging from the substrate. Furthermore, the signal-to-noise ratio is rendered less favorable by spurious spot images formed on the top surface of the substrate.

As explained more fully below, the method and means of this invention utilizes a transparent prismatic substrate to minimize the aforementioned defocusing and enlarging effects. Hence, a single light spot of optimum size, shape and intensity may be formed on the remote surface of the thin magnetic film.

The rotation of the major direction of polarization of the reflected light beam occurring during magnetic-to-optical transduction is a manifestation of the Kerr magneto-optical effect, a phenomenon first reported by John Kerr in 1877. In this regard, the Kerr magneto-optical effect should be distinguished from the more widely known Kerr electro-optical effect. The latter phenomenon involves rotation of the plane of polarization of a polarized beam as the result of a double refraction which occurs in some materials when they are subjected to an electric field. The magneto-optical effect, however, occurs upon the reflection of a light beam from a magnetized surface.

A magnetic-to-optical transducer and method embodying this invention may be applied in many ways. One application of great importance is in magnetic tape transcribing equipment. In this application, the magnetic-to-optical transducer is utilized to "sense" the presence and polarity of magnetic states distributed longitudinally at successive intervals along the tape.

A pickup head embodying this invention is characterized by many improvements over conventional pickup heads of the induction type. The latter utilize one or more electrical conductors carried on a U-shaped magnetic core disposed in frictional engagement with the moving magnetic tape. The external magnetic flux of the tape is intercepted by the core. As a result, a magnetic circuit is completed through the core from one extremity of the core to the other, and the ensuing changes in magnetic flux induce a voltage in the conductors.

The physical engagement between the magnetic core and the tape surface means that transducing equipment utilizing conventional pickup heads are characterized by considerable frictional wear of the magnetic tape. Moreover, magneto-electric transducers of this type are subject to several other disadvantages. Among these are impairment of operating characteristics as the result of oxide deposits built up in the gap on account of the physical contact and dynamic friction between the pickup head and oxide coating of the tape. A further disadvantage is the limitation in frequency and density of discrete magnetic signals which the pickup head can sense. This limitation arises from the necessity of making the contact surface of the pickup head great enough to "gather" enough magnetic flux from the tape to induce in the sensing conductors signal voltages of detectable amplitude, and also because of the tendency of external magnetic flux from the tape surface immediately surrounding the contact area of the pickup head to seek the low permeability path through the head. These characteristics of conventional pickup heads also limit the density of magnetic signals which can be recorded and sensed along the transverse dimension of the tape.

From the foregoing, it should be understood that any pickup head which dispenses with the need for physical contact between head and tape surface, and which further eliminates the requirement for establishment of a magnetic circuit external to the signal-bearing area of the tape, would be free from the disadvantages inherent in the use of conventional heads of the inductive sensing type. The possibility of realizing these advantages through use of the Kerr magneto-optical effect has intrigued workers in the art. Instead of transporting the tape in rubbing relation with the exposed core surfaces of a conventional pickup, a successful application of the Kerr magneto-optical effect would make it possible to "read" the magnetic states distributed on the tape merely by focusing a tiny spot of light on the magnetized surface. The small spot would not deform the external magnetic field of the tape, and it should be possible to make the spot somewhat smaller than the surface area of the tape occupied by a single magnetic state. As a result, the frequency sensitivity of the pickup head, and the density of magnetic signal states per unit area could be increased enormously. Furthermore, the elimination of physical contact between the pickup surface and the tape surface should result in an important reduction in the rate of wear; and, for the same reason, impairment of readout as the result of oxide buildup would be obviated.

Although attempts previously have been made to utilize the Kerr magneto-optical effect in "reading" magnetic signals directly from magnetic tape, these attempts generally have been unsuccessful on account of variations in the optical characteristics of the tape surface. These variations, in the form of light scattering attributable to oxide particles, and other surface irregularities, impose an undesirable modulation on the intensity of light reflected as the tape moves by. It is impractical to manufacture tape having a magnetic coating with suitable optical characteristics for direct readout. Furthermore, a tape surface having acceptable optical characteristics at the time of manufacture would become impaired rapidly in the course of repetitive tape readings with existing equipment.

The transfer of magnetic signals from tape to magnetic film makes it easy to achieve a signal-bearing, magnetized surface having optimum optical characteristics for magneto-optical readout. It is comparatively easy, for example, to control the deposition of a thin magnetic film onto the smooth surface of a transparent substrate, but is difficult to achieve a like degree of control during the manufacture of magnetic tape. Moreover, magneto-optical transduction occurs simultaneously with the induction of the magnetic signal from the tape of the film. Hence, it is unimportant whether the thin film has magnetic properties which enable it to retain a high degree of magnetization following exposure to the signal on the tape. It is necessary only that the thin film have a high permeability and a coercivity low enough to provide a good magnetic circuit for external flux in the vicinity of the tape surface.

In accordance with the embodiment of this invention described below, magneto-optical transduction is accomplished by induction of the magnetic signals carried by the tape into an adjacent thin magnetic film while simultaneously scanning the remote surface of the thin film directly opposite to the point of induction with a small spot of light. Although the light incident on the film preferably is polarized linearly, unpolarized light may be used.

As explained above, this use of the Kerr magneto-optical effect makes it possible to obtain a "reading" of the magnetic state induced on the remote surface of the thin film in terms of a rotation of the major direction of polarization of a light beam reflected therefrom through an angle greater or less than 180°. The direction of the angle of rotation is determined by the polarity of the magnetic field present at the reflecting surface of the film. Any rotation of the major direction of polarization after reflection from the film, resulting in a non-parallel relationship with the major direction of polarization which would exist in the absence of a magnetic field at the reflecting surface, is translated into a change in light intensity in a direction determined by the direction of the rotation. The magnitude of the change in intensity is proportional both to the amount of reflected light and the amplitude of the angle of rotation. The resulting variations in light intensity then are transduced into corresponding electrical signals through use of a photoelectric detector.

An embodiment of this invention comprises a transparent prismatic substrate having one side curved to form a convex surface. A thin magnetic film having a thickness of 500 to 2,500 angstroms is disposed over the convex side of the substrate. The substrate is supported in a fixed position and the magnetic tape is disposed so that its magnetic coating may be moved in magnetic relation with respect to the film. Inasmuch as the thin magnetic film of the pickup head preferably has a square loop magnetization curve and a low coercivity on the order of 2–20 oersteds, it is necessary only that the magnetized layer of the tape be close enough to the film to drive the latter from saturation in one direction to saturation in the opposite direction, and vice versa. A light source is disposed so that a beam of light, preferably polarized, may be oriented in perpendicular relation to one of the flat sides of the prismatic substrate in order to form a small spot of light on a tiny area of the concave surface of the film. Light from the small spot is reflected from the surface of the film to an optical-analyzer photodetector unit. In the event that the surface of the tape physically engages the thin film, wear may be minimized by coating the thin film with a layer of molecular thickness formed of rhodium, or other materials having like characteristics. Alternatively, means may be provided for achieving wear reduction by establishing a thin cushion of air between the tape and film surfaces.

It should be noticed that this invention provides a reflective surface having easily controlled optical properties. The light is always reflected from the same point on the thin magnetic film, and the area from which reflection occurs is sealed permanently between the surface of the substrate and the body of the film itself. This eliminates any possibility of impairment of optical properties as the result of dirt accumulations or mechanical wear of the film.

The rotation of the major direction of polarization of the reflected light beam may be amplified by a layer of transparent dielectric material of a few molecules thickness interposed between the thin magnetic film and the convex surface of the prismatic substrate. Silicon monoxide and zinc sulfide have been found to be especially effective for this purpose although good results may be obtained through the use of bismuth, stannic oxide, cadmium sulfide and other transparent dielectrics.

The foregoing paragraphs are intended to summarize and explain the significance of this invention in relation to the problems which it resolves, and should not be construed to narrow the scope of protection provided by the claims set forth hereinafter. For a more complete understanding of the structure, operation and novel features of the embodiments of this invention, consider the following description with reference to the drawings, wherein:

PRIOR ART BACKGROUND

Figure 1:
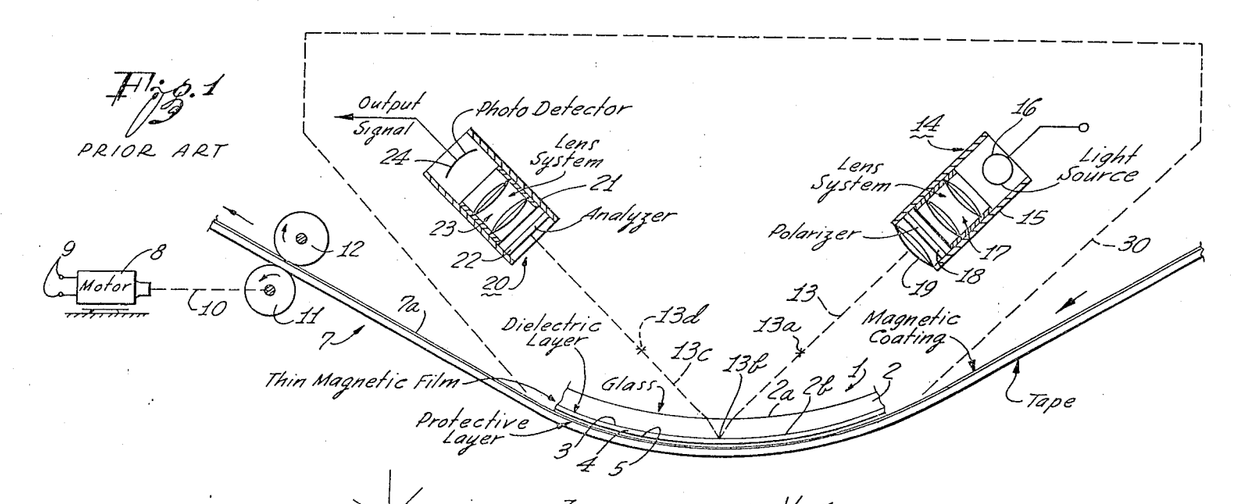
FIGURE 1 represents diagrammatically a magneto-optical transducer utilizing a stationary arcuate pickup head of the type known to the prior art.

A magnetic-optical pickup typical of the prior art is represented in FIGURE 1 and includes a stationary magneto-optical read-out head 1 responsive to magnetic signals distributed longitudinally along magnetic tape 7. An electric motor 8 supplied with electric power at terminals 9 from a source (not shown) drives tape 7 from an input supply reel (not shown) via any conventional transport mechanism, represented symbolically as a mechanical linkage 10 and a capstan 11 rotating in cooperation with idler roller 12. The tape may be taken up on an output reel (not shown).

A beam 13 of light linearly polarized to have its electric intensity vector 13a parallel to a plane tangential to the reflecting surface at point 13b on magneto-optical pickup 1 is generated by a light source 14. An optical-electrical transducer 22 is disposed in the path of light reflected from point 13b of the optical pick-up head 1 to detect any component of the reflected electric intensity vector 13c which is not parallel to the electric intensity vector 13a of the incident beam, and to produce an electric signal representing the direction and magnitude of the displaced component.

It should be noticed that the direction of an electric intensity vector is rotated through an angle of 180° upon reflection from any surface. In FIGURE 1 this phenomenon is represented by the cross designated 13d, showing that the electric vector 13a has been rotated through an angle of 180°.

For simplicity, it was assumed that light beam 13 impinged on pickup head 1 at a time when no magnetic flux was present at the point of incidence 13b. Hence, no detectable rotation has occurred and the reflected electric intensity vector 13d remains parallel to the electric intensity vector 13a of the incident beam.

Although the light beam 13 utilized in the transducer of FIGURE 1 of this invention and other embodiments is linearly polarized, it should be understood that magneto-optical detection may be accomplished through use of a non-polarized beam. In this instance, polarization in a major direction which normally occurs upon reflection from any unmagnetized surface, will be displaced angularly from the usual direction of polarization by the magnetic field, if any, at the reflecting surface.

It is well known that, upon reflection of an unpolarized light beam, the components of the beam perpendicular to the plane of incidence will be reflected with greater intensity than components which are parallel to the plane of incidence. Hence, the reflected light will have a major direction of polarization parallel to the reflecting surface. In accordance with the Kerr magneto-optical effect, this major direction of polarization then will be displaced through an angle having a direction determined by the polarity of any magnetic field which may exist at the reflecting surface. Thus, the reflected light beam will carry an optical representation of the state of magnetization at the reflecting surface in the form of a rotated major direction of polarization forming an acute angle with respect to the major direction of polarization which would exist in the absence of a magnetic field. Through the use of the optical-electric transducer 22, this optical representation may be detected and transduced into an electrical signal representing the presence and polarity of a magentic state at the reflecting surface.

All of the optically active components of the embodiment represented in FIGURE 1, including light source 14 and the optical-electric transducer 22 are enclosed by a light-proof housing, symbolically represented by dotted line 30. The magneto-optical pickup head 1 may be incorporated at any convenient location in the wall of the housing 30.

The magneto-optical pickup head 1 is made up of an arcuate transparent substrate 2 having a concave inner surface 2a and a convex outer surface 2b. The convex outer surface 2b is coated with a layer of transparent dielectric material a few molecules thick. The dielectric layer 3 is provided for the purpose of amplifying the rotation of the major direction of polarization of light reflected from point 13b of thin film 4. It has been found, for example, that a silicon monoxide or zinc sulfide layer will increase the angle of rotation by as much as a multiple of 5. Other dielectrics like bismuth, stannic oxide and cadmium sulfide also will amplify the resulting rotation. The amplification phenomenon is not understood fully. However, it appears from experimental evidence that the magnitude of amplification is related to the relative refractive index between thin magnetic film 4 and the dielectric layer 3. In fact, it has been theorized that amplification varies directly as a function of the relative index of refraction. In accordance with another hypothesis, the improvement resulting from use of layer 3 is attributed to cancellation of "noise" components of the reflected beam on account of optical interference betwen light reflected respectively from the surface of the layer 3 and the surface of the film 4.

Overlying the dielectric layer is a thin magnetic film having a thickness of 500 to 2,500 angstroms. A thin protective layer 5 of hard, smooth, wear-resistant material may be disposed over the surface of thin film 4.

Figure 5:
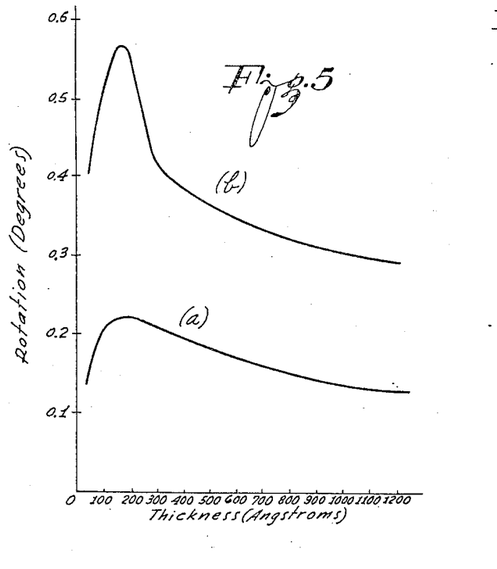
FIGURES 5(a) and 5(b) are a pair of curves illustrating the relationship between the rotation of the light and the thickness of the thin magnetic film for the prior art transducer of FIGURE 1 and the transducer of the present invention shown in FIGURE 4.

As shown in the generalized curve of FIGURE 5(a), the degree of rotation of the light increases as the thickness of the thin magnetic film decreases until a maximum rotation of the light is achieved when the thin magnetic film has a thickness of approximately 150 angstroms for a material such as 50% cobalt and 50% iron. The particular thickness to produce the maximum rotation depends upon the particular material used for the thin film.

The light source 14 provides a beam 13 of linearly-polarized light having its electric intensity vector parallel to the reflecting surface at point 13b of pickup head 1. The light source 14 is supported so that the angle of incidence of the beam 13 at point 13b is acute. Experimental results indicate that an angle of incidence of 60° ordinarily will maximize the magneto-optical effect. As represented in FIGURE 1, the light source 14 is comprised of housing 15 containing a source of illumination 16, a collimating lens system 17, a plane-polarizing element 18, and a focusing lens 19.

The optical-electric transducer 20 is disposed in a position to intercept light reflected from the point of incidence 13b, and is made up of a housing 21 containing an analyzer 22, a focusing lens system 23, and a photoelectric detector 24. The analyzer 22 is oriented in housing 21 so that its single plane of light transmission forms an acute angle, normally near, but not equal to 90°, with respect to the plane of polarization of light supplied from source 14. As a result, any rotation of the major direction of polarization of light reflected from point 13b in a first direction will reduce the intensity of the light passed by the analyzer 22, but a rotation in the opposite direction will increase the intensity of the transmitted light. Inasmuch as the direction of angular rotation of the reflected light from a parallel relationship with the direction of polarization of the incident beam will be determined by the polarity of the magnetization induced in film 4 at the point of incidence 13b, the change in the intensity of light passed through analyzer 22 above and below a reference level will represent the polarity of the magnetic signal currently being read. This fluctation of light intensity is then transduced by the photodetector 24 into a corresponding change in electrical current or voltage. The photodetector 24 may be a photoconductor, photomultiplier, vidicon, or other light responsive device.

Although the magneto-optical phenomenon manifested by the rotation of the major direction of polarization in a light beam reflected from a magnetized surface was discovered first by John Kerr in 1877, workers in the field are not in general agreement as to the correct physical explanation of this effect. Expressed qualitatively, one explanation of the magneto-optical effect is represented in the vector diagram of FIGURE 2. A ray of light 13 is shown impinging at an angle on thin film 4 at point 13b. The thin film 4 has been magnetized as a result of the magnetic signal state carried in magnetic coating 7a of tape 7. As a result, the surface of thin film 4 at the point of incidence 13b is magnetized in the direction of the flux lines $H_f$. The direction of $H_f$ is parallel to the reflecting surface at point 13b. The light beam 13 has been linearly polarized so that its electric intensity vector (E) is parallel to the reflecting surface at point 13b and its associated magnetic component (H) is oriented in a direction normal to the plane containing vector (E) and light ray 13. The angle (O) at which polarized light beam 13 is incident on the surface of thin film 4 is acute, and may be equal to 60°, an angle empirically found to produce a maximum angular displacement of the major direction of polarization of a light beam upon reflection from a magnetized surface.

Figure 2:
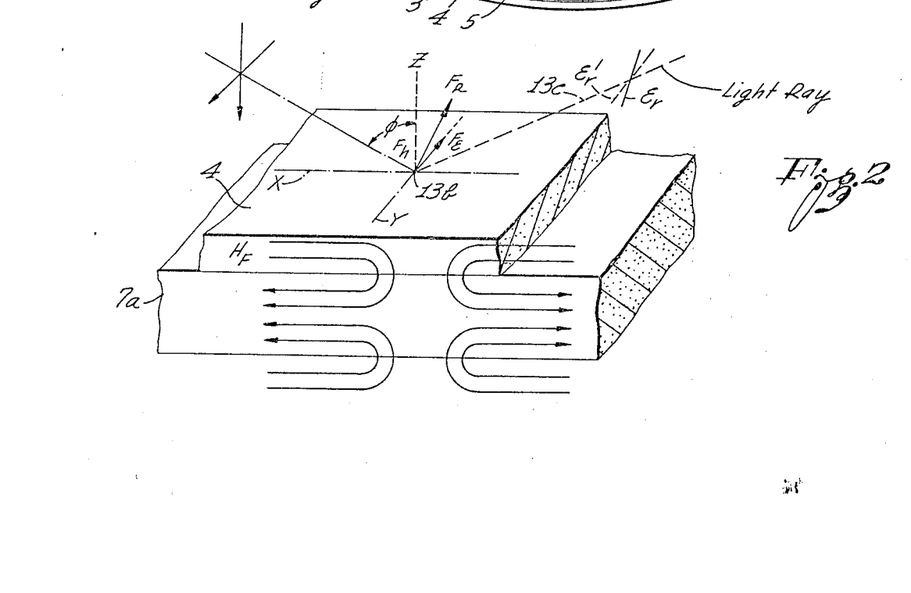
FIGURE 2 is a composite vector diagram and fragmentary view of the thin magnetic film and magnetic tape coating helpful in explaining the Kerr magneto-optical effect.

When the incident light ray 13 impinges on the surface of thin film 4 at point 13b, the electric intensity vector (E) results in a force $F_e$ on the affected boundary electrons of the material. This force is displaced 180° from the direction of (E). As a result of the magnetic vector (H) of the incident beam, any resulting movement of the affected electrons caused by $F_e$ results in a component of force $F_h$ oriented in a direction normal both to the force $F_e$ and to the ambient magnetic field $H_f$ at point 13b. Hence, $F_h$ will be proportional to electron velocity and to the intensity of the magnetic field $H_f$ at the surface of the film. The resultant force $F_r$ of the first and second components $F_e$ and $F_f$, respectively, will cause an angular displacement in the principal direction of motion of the affected electrons, with the result that the path of motion of these electrons will describe an arc. Consequently, the reflected light beam 13c generated from this motion will be polarized elliptically with the major axis of electric intensity angularly displaced from that of the electric intensity vector (E) of the incident ray 13. As shown by the electric intensity vectors $E_r$ and $E'_r$, this displacement may occur in either direction with reference to the direction of (E) in the incident light ray 13. The amplitude of the angle by which electric intensity vector $E_r$ or $E'_r$ is displaced with respect to vector (E) of the incident light beam will be proportional to the surface magnetization $H_f$ at the point of incidence 13c, and to the cosine of the angle between the electric intensity vector (E) and the direction of polarization of $H_f$. Whether the direction of displacement of the electric intensity vector of the reflected beam will be in the direction $E_r$ or $E'_r$ will depend on the direction of polarization of the magnetic field $H_f$.

Figure 6:
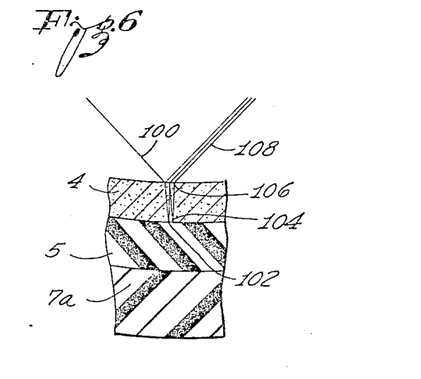
FIGURE 6 is a cross-sectional view illustrating the enhancement of the rotation due to multiple reflections.

In FIGURE 5a it is illustrated that the rotation of the light increases as the thickness of the thin magnetic film decreases and a maximum rotation occurs when the thin magnetic film has a thickness of approximately 150 angstroms, depending upon the particular material used for the thin film. Although it is not known exactly why the rotation varies with the thickness of the thin magnetic film, one possible explanation is illustrated in FIGURE 6. In FIGURE 6 a detailed cross-sectional view of the thin film 4, dielectric 5 and magnetic tape 7a is shown with a beam of light 100 directed towards the thin film 4. As the beam of light 100 strikes the surface of the thin film 4, a portion of the light energy is reflected and rotated in accordance with the Kerr magneto-optical effect. The rotation occurs in the plane of polarization of the reflected wave. In addition to the above, a portion of the light energy enters into the thin film 4.

As the thickness of the thin film is reduced, the transmissivity of the thin film increases so that some of the light which passes into the thin film experiences multiple reflections. When the magnetic film 4 is relatively thick, the light which enters into the film 4 is merely absorbed with no additional reflections. The multiple reflections are shown at points 102, 104 and 106. Actually, the number of reflections which occur are more than shown in FIGURE 6, and the particular number of multiple reflections depends on the thickness of the thin film.

Each time the light energy strikes the top surface of the thin film 4, a portion of the light energy leaves the thin film and acts as an added component to the original reflected components of the light energy. In addition, each time the light energy is reflected, such as points 102, 104 and 106, a rotation of the light occurs. The total light energy 108 leaving the thin film 4, therefore, is composed of a plurality of components each rotated due to the Kerr magneto-optical effect. The various components of the total light energy 108 add together to produce an effective magnification of the rotation of the light energy. In addition, since each of the components of the light energy 108 has a different phase relationship, the total phase relationship is enhanced so as to reduce the ellipticity of the total light energy 108. The reduction of the ellipticity is advantageous since it increases the contrast in the output signal produced from the rotated light energy. It is to be appreciated that a portion of the light energy for the structure of FIGURE 1 leaves the thin film 4 and enters the dielectric member 5 and is lost.

Although the maximum rotation of the light occurs when the thin magnetic film has a thickness of approximately 150 angstroms for a particular magnetic material of 50% cobalt and 50% iron, it is to be appreciated that substantial increases in the degree of the rotation of the light may be effected by using a thin magnetic film having a thickness of 500 to 1,000 angstroms, as opposed to thin magnetic film having thicknesses greater than 1000 angstroms, as shown in FIG. 5a. The increase in rotation of the light is significant in comparison to the thicker layers of magnetic material as used on prior art magnetic mediums, such as tapes, drums, discs, etc.

IMPROVED MAGNETO-OPTICAL TRANSDUCER OF THIS INVENTION

A magneto-optical transducer of the type described above with reference to FIGURE 1 constitutes an important advance in the art of transcribing magnetic signals, and will operate satisfactorily in most applications. However, a considerable improvement in signal-to-noise ratio, light spot reduction, rotation of the light, and reduction in the power required to produce a satisfactory light spot on the thin magnetic film may be achieved with the magneto-optical pickup head incorporating the novel improvement of this invention.

Figure 3:
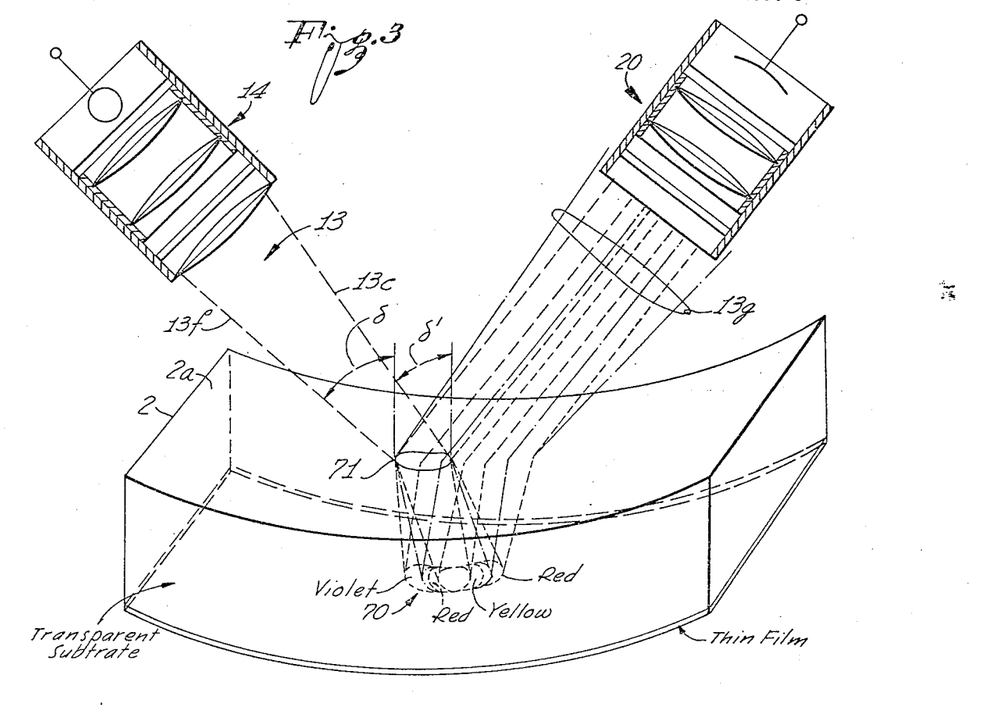
FIGURE 3 represents diagrammatically the way in which spurious images of the light spot may be formed, and the manner in which spot defocusing and enlarging occurs in a prior art pickup head of the type represented in FIGURE 1.

As portrayed in FIGURE 3, a conventional magneto-optical transducer of the type represented in FIGURE 1 utilizes a transparent, arcuate substrate 2 of uniform thickness. As a result, the light beam 13 produced by the light source 14, and focused to form a light spot 70 on the thin film 4, also produces a spurious spot image 71 on the exposed concave surface 2a of substrate 2. The spurious image 71 is unaffected by the magnetic state, if any, of thin film 4, and the light energy from the image constitutes a source of undesirable ambient radiation. This spurious radiation passes to the optical-electrical transducer 20 where it results in electrical "noise" components in its signal output. In addition to the formation of the spurious spot image 71, the light rays 13e and 13f near the boundaries of the polychromatic light beam 13 are separated into their various color components as a result of refractive effects. This accentuates the elongation of the true spot image 70 formed on the surface of thin film 4. Moreover, the curvature of substrate 2 and refraction upon emergence from surface 2a accentuates the divergence of the rays 13g from the true spot image 70. Consequently, the optical-electric transducer 20 "sees" a somewhat defocused, enlarged and fuzzy true spot image 70.

For example, the light rays forming the uppermost boundary of the polychromatic light beam 13, designated generally by the numeral 13e, enter the concave surface 2a of substrate 2 at an angle of incidence δ′. The components of the uppermost light rays 13e having a frequency corresponding to that of red light are refracted less than components of higher frequency and shorter wavelength; that is, components correspond respectively to orange, yellow, green, blue and violet. This spreading of rays 13e into corresponding color separation bands effectively lengthens and defocuses true spot 70.

Furthermore, upon reflection from the true spot image 70, the color separation bands undergo further refraction upon emerging from the concave surface 2a of substrate 2. This diverges the emergent rays 13g of beam 13 even further Likewise, the lowermost rays 13f of polychromatic beam 13 undergo color separation. The lowermost rays 13f of polychromatic beam 13 enters the concave surface 2a of substrate 2 at an angle of incidence δ. This angle of incidence differs from the angle of incidence δ' of the uppermost ray 13e on account of the convergence of the polychromatic beam 13 and the curvature of the upper surface 2a of substrate 2. As a result, the color separation of the lowermost rays 13f may produce bands of color differing in width from those developed from the uppermost ray 13e. Although the rays along the sides and in the center of the beam 13 also undergo color separation upon entering substrate 2, the color bands overlap and result in a polychromatic area of true spot 70. Accordingly, these rays contribute little, if any, to the enlargement of the true spot image 70.

The net result of the refractive effects upon the uppermost and lowermost rays 13e and 13f, respectively, is to cause a defocusing of the true spot image 70, and to accentuate its dimension in the direction of curvature. Similar refractive effects which occur upon emergence of the reflected rays 13g of the true spot image 70 from the concave surface 2a of substrate 2 results in further dispersion and fuzziness of the spot image.

The aforedescribed optical effects impose undesirable limitations on the size of the true spot image 70 which can be formed on the concave surface 2a of the thin magnetic film 4 with a light beam 13 of given cross-section dimension. Furthermore, the resulting dispersion of light energy means that the light source 14 must produce a light beam 13 of greater intensity than would be necessary for good results if these diffusing effects did not occur.

Figure 4:
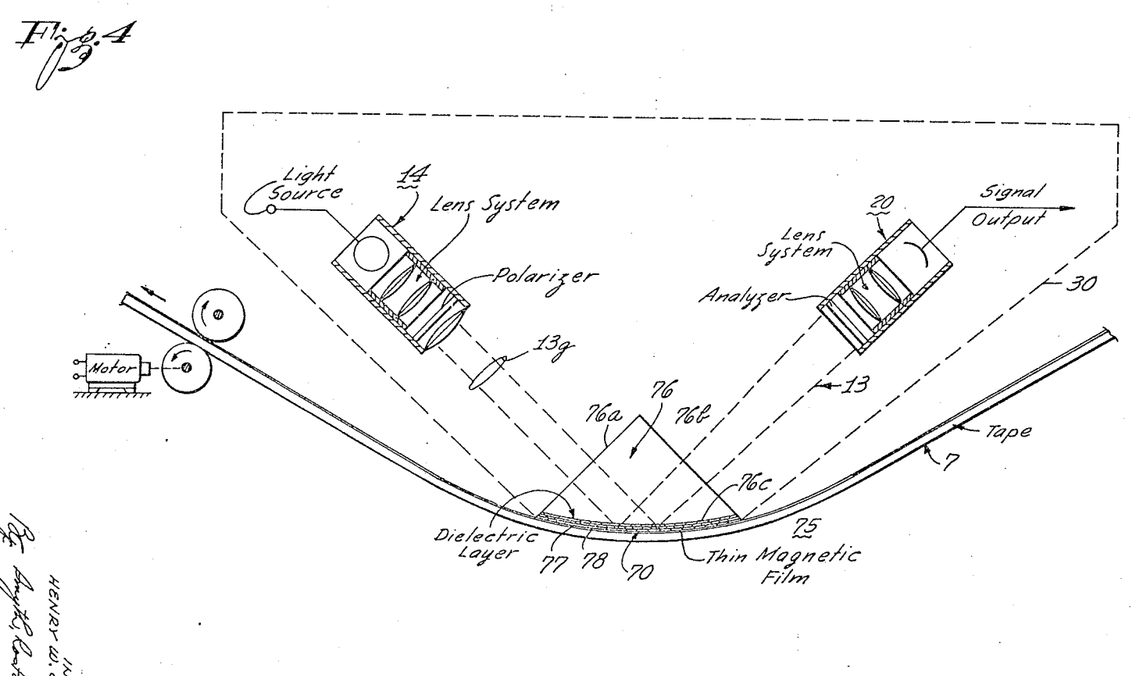
FIGURE 4 represents diagrammatically an embodiment of this invention utilizing a transparent prismatic substrate to eliminate spurious images and minimize the effects of defocusing and enlarging.

The disadvantageous optical effects described above can be obviated through use of a magneto-optical pickup head 75 of the type represented in FIGURE 4. In general, the magneto-optical pickup head 75 comprises a transparent substrate 76 of prismatic configuration. The substrate 76 has two planar surfaces 76a and 76b normal to the incident and emergent sections of light beam 13, and an arcuate surface 76c covered with a layer of transparent dielectric material 77 of molecular thickness, and a thin magnetic film 78. The dielectric layer 77 and the thin magnetic film 78 may be made of the materials and have the general characteristics described for their counterparts 3 and 4, respectively, described above with reference to FIGURE 1. The light source 14 and the optical-electric detector 20 may be the same as those described above with reference to FIGURE 1.

Inasmuch as the incident and emergent sections of light beam 13 enter and leave the prismatic substrate 76 in perpendicular relation to the planar surfaces 76a and 76b, no spurious images can be formed, and refractive effects of the type described above are effectively eliminated. Accordingly, it becomes possible to focus the incident light beam 13 to form a sharp, true spot image 70 upon the concave surface of thin magnetic film 78. Furthermore, the light rays reflected from the true spot image 70 are entirely free of dispersion effects attributable to refraction.

FIGURE 5(b) generally illustrates the relationship between the rotation of the light and the thickness of the thin magnetic film. The degree of rotation of the light increases as the thickness of the thin film decreases until a maximum rotation of the light occurs when the thin film has a thickness of approximately 175 angstroms for a material such as 50% cobalt and 50% iron. The particular critical thickness depends upon the particular material used for the thin film.

The magneto-optical transducer of FIGURE 4 operates in substantially the same way as the transducer of FIGURE 1. Therefore, FIGURE 6 may be used to explain the operation of the enhancement of the rotation of the light equally as well for FIGURE 4 as for FIGURE 1. One of the advantages in the use of the transducer having a prism, as shown in FIGURE 4, is that the use of the prism enhances the multiple reflections, as shown in FIGURE 6. That is, since the prism may be designed to provide for a total internal reflection of the light energy penetrating through the thin film, as shown in FIGURE 6, a larger portion of the light energy experiences the multiple reflections. This is because, for the transducer of FIGURE 4, no light is lost in the dielectric layer 5 as with the transducer of FIGURE 1, and the additional light energy experiencing the multiple reflections enhances the rotational effect.

In addition to the above, the ellipticity of the light energy is reduced when using the prism in the same magnet as explained with reference to FIGURE 6. However, the use of the prism also enhances the reduction of the ellipticity.

It should be noticed that the arcuate surface 76c of prismatic substrate 76 has a curvature at least as great as the curvature of the adjacent loop of magnetic tape 7. This feature minimizes wear in embodiments designed for frictional engagement between tape 7 and thin film 78. It is obvious that this objective can be achieved with a planar surface, or surfaces of other curvature. The only requirement is that the contact pressure between the contiguous surfaces of tape 7 and thin film 78 be distributed uniformly.

In still other embodiments, a slight separation may be maintained between the adjacent surfaces of tape 7 and thin film 78 in order to minimize frictional wear. Here, the only requirement is that the surfaces be close enough to maintain a sufficient magnetic relation between the tape 7 and the thin film 78.

The representations in the drawings and the foregoing text are intended merely to facilitate the practice of this invention by persons skilled in the art, not to restrict its scope. Moreover, it is obvious that many variations and substitutions may be made with respect to the embodiment described above while remaining within the scope of this invention as set forth in the following claims:

I claim:
1. A magneto-optical transducer utilizing a magneto-optical effect to produce a nonmagnetic representation of the magnetic states of a first magnetizable material, said transducer including:

a thin magnetic film constructed to be disposed in contiguous relationship to the first magnetizable material to reecive induced magnetic states in accordance with the magnetic states in the first magnetizable material;

light transmissive means having first and second surfaces in a particular angular relationship to each other, different from a parallel of coplanar relationship, to serve as incident and emergent surfaces for light and having a third surface disposed in angular relationship to the first and second surfaces, different from a parallel or coplanar relationship, and supporting the thin magnetic film in contiguous relationship with the first magnetizable material and for cooperating with the thin magnetic film to obtain a reflection to emergent surface of light passing through the incident surface and for obtaining variations of the polar characteristics of the light reflected by the thin magnetic film in accordance with the magnetic states induced in the thin magnetic film;

the thin magnetic film having a thickness to provide for a magnification of the polar characteristics of the reflected light;

means disposed relative to the emergent surface for receiving the light passing through the emergent surface and for producing a signal having characteristic variations in accordance with the variations in the polar characteristics of the emergent light; and a source of light disposed relative to the incident surface to transmit light through the incident surface to the third surface along a path intercepting the thin film and inhibiting any refraction of the light to obtain a reflection of the light by the thin film and a variation in the polar characteristics of the reflected light in accordance with the magnetic states induced in the thin film.

2. The transducer set forth in claim 1 wherein the source of light includes a polarizer constructed to polarize the light beam and the receiving means includes an analyzer constructed to pass only the rotated light reflected by the thin film.

3. A magneto-optical transducer utilizing a magneto-optical effect to produce a nonmagnetic representation of the magnetic states of a first magnetizable material, said transducer including:

a thin magnetic film constructed to be disposed in contiguous relationship to the first magnetizable material to receive induced magnetic states in accordance with the magnetic states in the first magnetizable material;

a light-transparent substrate having two end surfaces and also having at least two planar side surfaces in mutually angular relationship to each other different from a parallel relationship and further having a third side surface in angular relationship to the two planar side surfaces different from a parallel relationship, the third side surface supporting the thin magnetic film in contiguous relation with the first magnetizable material for receiving light passing through a first one of the two planar side surfaces in a direction transverse to the first planar surface and for obtaining a rotation of the received light by the thin magnetic film in accordance with the magnetic states induced in the thin magnetic film and for directing the rotated light to the second one of the planar side surfaces in a direction transverse to the second planar light surface for passage of the light through the second one of the planar side surfaces;

the thin magnetic film having a thickness to provide a magnification of the rotation of the light;

means disposed relative to the second planar side surface for receiving the rotated light passing through the second planar side surface and for producing a signal having characteristic variations representing the variations in the characteristics of the rotated light; and a source of light disposed relative to the first planar side surface to transmit a light beam through the first planar along a path intercepting the thin film and transverse to the planar side surface of the light-transparent substrate.

4. The magneto-optical transducer set forth in claim 3 wherein the source of light includes a polarizer for polarizing the light beam and the receiving means includes an analyzer for passing only the light rotated by the thin magnetic film.

5. A magneto-optical transducer utilizing a magneto-optical effect to produce a nonmagnetic representation of the magnetic states of a first magnetizable material, said transducer including:

a thin magnetic film constructed to be disposed in magnetically proximate relationship to the first magnetizable material to receive induced magnetic states in accordance with the magnetic states in the first magnetizable material;

a transparent substrate of generally prismatic configuration, the substrate having at least two planar side surfaces in a particular angular relationship different from a parallel or coplanar relationship and having third side surface disposed in angular relationship to the two planar side surfaces, different from a parallel or coplanar relationship, the third side surface supporting the thin film for receiving light from a first one of the two planar side surfaces in a direction substantially perpendicular to the first planar side surface, obtaining a rotation of the light by the thin film in accordance with the magnetic states in the thin magnetic film and directing the rotated light to the second one of the two planar side surfaces in a direction substantially perpendicular to the second planar side surface;

the thin magnetic film having a thickness to provide for a magnification of the rotation of the light;

a thin dielectric layer disposed between the third side surface and the thin magnetic film;

means disposed relative to the second planar side surface for receiving the rotated light passing through the second planar side surface and for producing a signal having characteristic variations representing the variations in the characteristic of such rotated light; and a source of light disposed relative to the first planar surface to transmit light through the first planar surface in a direction substantially perpendicular to the first planar surface along a path intercepting the thin film to obtain a rotation of the light in accordance with the magnetic states induced in the thin film and to obtain a passage of the rotated light through the second planar side surface in a direction substantially perpendicular to the second planar side surface.

6. In a transducer utilizing a magneto-optical effect to produce nonmagnetic representations of the different magnetic states of a first magnetizable material, a thin magnetic film constructed to be disposed in contiguous relationship to the first magnetizable material to receive by magnetic induction the different magnetic states of the first magnetizable material;

first means disposed relative to the thin magnetic film for producing a spot of light on the surface of the thin magnetic film to obtain a rotation of the light in accordance with the magnetic states induced in the thin magnetic film and to obtain a reflection of the rotated light by the thin magnetic film;

a second means disposed relative to the rotations of the light reflected from the thin film for developing a signal representing the rotations of the light in the thin magnetic film; and means disposed in the path of the light beam and supporting the thin magnetic film in contiguous relation with the first magnetizable material without producing spurious spot images, color separation, and consequent spot-image defocusing and enlargement; the said supporting means comprising: a transparent substrate having at least two planar side surfaces in mutually angular relationship different from a parallel or coplanar relationship and individually in substantially perpendicular relationship to the direction of the light from the first means and the light reflected by the thin magnetic film, the substrate having another surface supporting the thin film in contiguous relation with the first magnetizable material and in mutually angular relationship, different from a parallel or coplanar relationship, with the two planar side surfaces.

7. In the transducer set forth in claim 6, the first means including a polarizer for polarizing the spot of light and the second means including an analyzer for passing only the light rotated by the thin magnetic film.

8. In the transducer set forth in claim 7, a thin dielectric layer disposed between the thin magnetic film and the substrate to amplify the rotations of the light reflected by the thin magnetic film.

9. In a transducer utilizing a magneto-optical effect to produce nonmagnetic representations of the magnetic states of a first magnetizable material and including first means for producing a light beam and second means for producing a signal representing the rotation of light resulting from the magnetic states of the first material, a magneto-optical sensing head characterized by the effective elimination of refractive effects and consequent light-spot defocusing and enlargement and by the minimizing of spurious spot images and consequent improvement of the signal-to-noise ratio of the output signal, the sensing head including:

a transparent substrate having a first planar side surface in transverse relation to the light beam, a second planar side surface in mutually angular relationship, different from a parallel relationship, with the first surface, and a third side surface in proximate relation to the first magnetizable material and in angular relationship, different from a parallel relationship, with and defining boundaries for the first and second planar surfaces; and a thin magnetic film disposed on the third side surface in magnetic proximity to the first magnetizable material to obtain an induction in the thin magnetic film of the magnetic states in the first magnetizable material and to obtain a reflection of the light from the light beam by the thin magnetic film and obtain a rotation of the reflected light by the thin magnetic film in accordance with the magnetic states induced in the thin magnetic film.

10. In the transducer set forth in claim 9, the third side surfacing forming equal angles with the first and second side surfaces and the first side surface being disposed to receive the light beam in a substantially perpendicular relationship between the light beam and the first side surface and the second side surface being disposed to pass the light beam in a substantially perpendicular relationship between the light beam and the second side surface.

11. In the transducer as set forth in claim 10, a thin dielectric layer disposed between the thin magnetic film and the third side surface for amplifying the angular rotation of the light reflected by the thin magnetic film.

12. In a transducer utilizing a magneto-optical effect to produce nonmagnetic representations of magnetic information, including first means for producing a light beam and second means for producing a signal representing the rotation of light resulting from the magnetic information, a magneto-optical sensing head, including a transparent substrate having a first planar side surface in substantially normal relationship to the light beam, a second planar side surface in mutually angular relationship, different from a parallel relationship, with the first side surface, and a third side surface in equiangular relationship, different from a parallel relationship, with the defining boundaries for the first and second planar side surfaces, and a thin magnetic film disposed on the third side surface and having magnetic states representing the magnetic information to obtain a reflection of the light from the light beam by the thin magnetic film and to obtain a rotation of the reflected light by the thin magnetic film in accordance with the magnetic states in the thin magnetic film, the thin magnetic film having a thickness to provide for a magnification of the rotation of the light.

13. The magneto-optical sensing head of claim 12 additionally including a thin dielectric layer disposed between the thin magnetic film and the third side surface for amplifying the rotation of the reflected light by the thin magnetic film.

14. In a transducer utilizing a magneto-optical effect to produce nonmagnetic representations of magnetic information and including first means for producing a light beam and second means for receiving the light beam and for producing a signal representing the rotation in the beam of light resulting from the magnetic information, a magneto-optical sensing head, including an optical prism constructed to receive the light from the first means and to pass the light to the second means, and a thin magnetic film disposed on one surface of the optical prism and having magnetic states representing the magnetic information to obtain a reflection by the thin magnetic film of the light passing to the optical prism from the light beam and to obtain a rotation of the reflected light by the thin magnetic film in accordance with the magnetic states in the thin magnetic film, the magnetic film having a thickness to provide for a magnification of the rotation of the light.

15. The magneto-optical sensing head of claim 14 additionally including a dielectric layer disposed between the thin magnetic film and the one surface of the optical prism for amplifying the rotation of the light reflected by the thin film.

16. A magneto-optical transducer utilizing a magneto-optical effect on light to produce a nonmagnetic representation of the successive magnetic states of a first movable magnetizable material, said transducer including:

a thin magnetic film disposed in magnetic proximity to the first movable magnetic material to receive induced magnetic states in accordance with the successive magnetic states in the first movable magnetizable material;

light transmissive substrate means having planar incident and emergent surfaces in a particular angular relationship different from 180° to each other and to the thin magnetic film and having a third planar surface supporting the thin magnetic film in a particular angular relationship different from 180° to the incident and emergent surfaces and in magnetic proximity with the first movable magnetizable material and for cooperating with the thin magnetic film to inhibit refraction of the light passing to and from the light transmissive substrate means and to obtain a reflection by the thin magnetic film to the emergent surface of the light passing through the incident surface and to obtain variations in the polar characteristics of the reflected light in accordance with the successive magnetic states induced in the thin magnetic film;

means disposed relative to the emergent surface of the light transmissive substrate means for receiving the light passing through the emergent surface and for producing a signal having characteristic variations in accordance with the polar characteristics of the emergent light; and a source of light disposed relative to the incident surface of the light transmissive substrate means to transmit light through the incident surface to the emergent surface along a path intercepting the thin film and relative to the incident and emergent surfaces of the supporting means to inhibit refraction of the light passing through the light transmissive substrate means.

17. A magneto-optical transducer utilizing a magneto-optical effect to produce a nonmagnetic representation of the successive magnetic statues of a first movable magnetizable material, said transducer including:

a thin magnetic film disposed relative to the first movable magnetizable material to receive induced magnetic states in accordance with the successive magnetic states in the first movable magnetizable material;

a light-transparent substrate having properties of changing the direction of light and having two surfaces, at least two additional planar surfaces in mutually angular relation different from 180° to each other, and having an additional planar surface in angular relation different from 180° to the two planar surfaces, the additional surface supporting the thin magnetic film in contiguous relation with the first movable magnetizable material for receiving light passing through a first one of the two additional planar surfaces and with the received light rotated in accordance with the successive magnetic states induced in the thin magnetic film and for reflecting the rotated light and directing the rotated light to the second one of the two additional planar surfaces;

means disposed relative to the second additional planar surface for receiving the light passing through the second additional planar surface and for producing a signal having characteristic variations in accordance with the variations in the rotated characteristics of the received light; and a source of light disposed relative to the first additional planar surface to transmit a light beam through the first additional planar surface to the signal-producing means along a path intercepting the thin film to obtain a reflection of the light to the second additional planar surface.

18. A magneto-optical transducer utilizing a magneto-optical effect to produce a nonmagnetic representation of the successive magnetic states of a first movable magnetizable material, said transducer including:

a thin magnetic film disposed in magnetically proximate relationship to the first movable magnetizable material to receive induced magnetic states in accordance with the successive magnetic states in the first movable magnetizable material;

a transparent substrate of prismatic configuration, the substrate having at least two planar surfaces in a particular angular relationship, different from a parallel or coplanar relationship, to each other and having a third planar surface supporting the thin film in angular relationship, different from a parallel or coplanar relationship, to the two planar surfaces for receiving light from a first one of the two planar surfaces in a direction substantially perpendicular to the first planar surface, the light being rotated in accordance with the successive magnetic states in the thin magnetic film, and for directing the rotated light to the second one of the two planar surfaces in a direction substantially perpendicular to the second planar surface;

means disposed relative to the second planar surface for receiving light passing through the second planar side surface and for producing a signal having characteristic variations in accordance with the variations in the rotational characteristics of such received light; and a source of light disposed relative to the first planar surface to transmit light through the first planar surface, in a direction substantially perpendicular to the first planar surface, to the signal-producing means along a path intercepting the thin film.

19. In a transducer utilizing a magneto-optical effect to produce nonmagnetic representations of the successive magnetic states of a first movable magnetizable material, a thin magnetic film disposed in magnetic proximity to the first movable magnetizable material to receive by magnetic induction the successive magnetic states of the first magnetizable material;

first means disposed relative to the thin magnetic film for producing a spot of light on the surface of the thin magnetic film to obtain a rotation of the light in accordance with the magnetic states in the thin magnetic film and to obtain a reflection of the rotated light by the thin magnetic film;

second means disposed relative to the light reflected from the thin film for developing a signal having characteristics representing the variations in the rotational characteristics of the light reflected from the thin magnetic film; and means disposed in the path of the light beam for supporting the thin magnetic film in magnetic proximity with the first movable magnetizable material without producing spurious spot images, color separation, and consequent spot-image defocusing and enlargement of the light reflected by the thin film, the supporting means comprising: a transparent substrate having at least two planar surfaces in mutually angular relation different from 180° relative to each other and in individually perpendicular relationship to the direction of the light from the first means and the light reflected by the thin magnetic film, the substrate having a third surface in angular relation different from 180° relative to the two planar surfaces, the third surface supporting the thin film in magnetic proximity with the first magnetizable material.

20. In a transducer utilizing a magneto-optical effect to produce nonmagnetic representations of the successive magnetic states of a first movable magnetizable material and including first means for producing a light beam and second means for producing a signal representing the rotation of light resulting from the successive magnetic states of the first movable magnetizable material, a magneto-optical sensing head characterized by the effective elimination of refractive effects and consequent light-spot defocusing and enlargement in the rotated light and by the absence of spurious spot images and consequent improvement of the signal-to-noise ratio of the output signal, the sensing head including:

a transparent substrate having a prismatic configuration and having a first planar surface in substantially normal relation to the light beam, a second planar surface in mutually angular relation different from 180° with the first surface, and a third side surface in proximate relation to the first movable magnetizable material and in equiangular relation, different from 180°, with and defining boundaries for the first and second planar surfaces; and a thin magnetic film disposed on the third side surface in magnetic proximity to the first movable magnetizable material to obtain an induction in the thin magnetic film of the successive magnetic states in the first movable magnetizable material and to obtain a reflection of the light from the light beam by the thin magnetic film and obtain a rotation of the reflected light by the thin magnetic film in accordance with the successive magnetic states induced in the thin magnetic film, the second planar surface being disposed in substantially normal relationship to the light reflected by the thin magnetic film.

21. The sensing head in the transducer as set forth in claim 20, including: a thin dielectric layer disposed between the thin magnetic film and the third side surface for amplifying the angular rotation of the light reflected by the thin magnetic film.

22. A magneto-optical transducer utilizing a magneto-optical effect to produce a nonmagnetic representation of the successive magnetic states of a first magnetizable material, said transducer including:

a thin magnetic film disposed relative to the first magnetic material to receive induced magnetic states in accordance with the successive magnetic states in the first magnetizable material;

means for directing light toward the thin magnetic film;

light transmissive means having planar incident and emergent surfaces disposed in mutually angular relation different from 180° relative to each other and having a third surface disposed in angular relation different from 180° relative to the incident and emergent surfaces and supporting the thin magnetic film for cooperating with the thin magnetic film to obtain a reflection to the emergent surface of the light passing through the incident surface and to inhibit any refraction of the light through the incident and emergent surfaces and to obtain variations in the polar characteristics of the reflected light in accordance with the successive magnetic states induced in the thin magnetic film; and means disposed relative to the emergent surface for receiving the light passing through the emergent surface and for producing a signal having characteristic variations in accordance with the variations in the polar characteristics of the emergent light.

23. A magneto-optical transducer utilizing a magneto-optical effect on light to produce a nonmagnetic representation of the successive magnetic states of a first movable magnetizable material, said transducer including:

a thin magnetic film disposed in magnetic proximity to the first movable magnetic material to receive induced magnetic states in accordance with the successive magnetic states in the first movable magnetizable material;

light transmissive means having a prismatic configuration and having incident and emergent surfaces in a particular angular relationship different from 180° to each other and to the thin magnetic film and having a third surface supporting the thin magnetic film in magnetic proximity with the first movable magnetizable material for cooperating with the thin magnetic film to inhibit any refraction of the light passing to and from the light transmissive means and to obtain a reflection to the emergent surface of the light passing through the incident surface and to obtain variations in the polar characteristics of the reflected light in accordance with the successive magnetic states induced in the thin magnetic film;

means disposed relative to the emergent surface for receiving the light passing through the emergent surface and for producing a signal having characteristic variations in accordance with the variations in the polar characteristics of the emergent light; and means disposed relative to the incident surface to transmit light through the incident surface to the emergent surface along a path intercepting the thin film, the incident and emergent surfaces of the light transmissive means being disposed relative to each other and to the source of light so that the incident light is substantially perpendicular to the incident surface of the light transmissive means and the emergent light is substantially perpendicular to the emergent surface of the light transmissive means to inhibit any refraction of the light.

24. In a transducer utilizing a magneto-optical effect to produce nonmagnetic representations of the successive magnetic states of a first movable magnetizable material and including first means for producing a light beam and second means for producing a signal representing the rotation of light resulting from the successive magnetic states of the first movable material, a magneto-optical sensing head for eliminating spurious spot images and with an improvement of the signal-to-noise ratio of the output signal, the sensing head including:

a thin magnetic film in magnetic proximity to the first movable magnetizable material to obtain an induction in the thin magnetic film of the successive magnetic states in the first movable magnetizable material and to obtain a reflection of the light from the light beam by the thin magnetic film and obtain a rotation of the reflected light by the thin magnetic film in accordance with the successive magnetic states induced in the thin magnetic film; and means disposed in the path of the light beam and supporting the thin magnetic film in magnetic proximity to the first movable magnetic medium and provided with a planar incident surface and a planar emergent surface disposed at an angle different from 180° relative to each other and to the path of the light beam for providing an incidence of light from the light beam on the incident surface in a direction substantially perpendicular to the incident surface and for providing an emergence of light from the emergent surface in a direction substantially perpendicular to the emergent surface for eliminating spurious spot images to reduce undesired ambient radiation.

25. A magneto-optical transducer utilizing a magneto-optical effect to produce a nonmagnetic representation of the successive magnetic states of a first magnetizable material, said transducer including:

a thin magnetic film disposed in magnetic proximity to the first magnetic material to receive induced magnetic states in accordance with the successive magnetic states in the first magnetizable material;

a source of light for directing light toward the thin magnetic film;

light transmissive means having planar incident and emergent surfaces and having a third surface supporting the thin magnetic film in contiguous relationship with the first magnetizable material, the incident and emergent surfaces being disposed at an angle different from 180° relative to each other and to the source of light and to the thin magnetic film to provide an incidence of light on the incident surface in a direction substantially perpendicular to the incident surface and to provide an emergence of light from the emergent surface in a direction substantially perpendicular to the emergent surface and for cooperating with the thin magnetic film to obtain a reflection to the emergent surface of the light passing through the incident surface and to inhibit any refraction of the light through the incident and emergent surfaces and to obtain variations in the polar characteristics of the reflected light in accordance with the successive magnetic states induced in the thin magnetic film, and means disposed relative to the emergent surface for receiving the light passing through the emergent surface and for producing a signal having characteristic variations in accordance with the variations in the polar characteristics of the emergent light.

References Cited
UNITED STATES PATENTS 3,229,273   1/1966   Baaba _____________ 340—174.1

TERRELL W. FEARS, Primary Examiner